(12) United States Patent
Mohan et al.

(10) Patent No.: US 12,007,757 B2
(45) Date of Patent: Jun. 11, 2024

(54) SYSTEMS AND METHODS FOR SURVEYING A MANUFACTURING ENVIRONMENT

(71) Applicant: Ford Global Technologies, LLC, Dearborn, MI (US)

(72) Inventors: Shankar Narayan Mohan, Ann Arbor, MI (US); Ansar Zunnoon Khan, Dearborn, MI (US); Mark Goderis, Canton, MI (US); Steven Schuchard, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 162 days.

(21) Appl. No.: 17/385,300

(22) Filed: Jul. 26, 2021

(65) Prior Publication Data

US 2022/0026890 A1    Jan. 27, 2022

Related U.S. Application Data

(60) Provisional application No. 63/057,136, filed on Jul. 27, 2020.

(51) Int. Cl.
*G05B 19/418* (2006.01)
*B60W 60/00* (2020.01)
(Continued)

(52) U.S. Cl.
CPC . *G05B 19/41875* (2013.01); *B60W 60/00259* (2020.02); *G05B 19/4155* (2013.01);
(Continued)

(58) Field of Classification Search
CPC .......... G05B 19/41875; G05B 19/4155; G05B 2219/45066; B60W 60/00259;
(Continued)

(56) References Cited

U.S. PATENT DOCUMENTS 10,011,352 B1 * 7/2018 Dahlstrom ............. B64U 30/20
10,317,905 B2    6/2019 Ouellette et al.
(Continued)

OTHER PUBLICATIONS

Luo et al., Distributed Algorithm Design for Multi-robot Generalized Task Assignment Problem, Nov. 3-7, 2013, IEEE/RSJ International Conference on Intelligent Robots and Systems (IROS), 4765-4767 (Year: 2013).*
(Continued)

*Primary Examiner* — Anne Marie Antonucci
*Assistant Examiner* — Jared C Bean
(74) *Attorney, Agent, or Firm* — Burris Law, PLLC (57) ABSTRACT

A survey system includes a controller storing a map comprising a plurality of nodes representing data capture points of the environment. The controller is configured to segment the plurality of nodes into a plurality of communities, where each community from among the plurality of communities includes a set of nodes from among the plurality of nodes. The controller is configured to generate, for each community from among the plurality of communities, one or more traversability scores. The controller is configured to assign, for each community from among the plurality of communities, at least one robot from among a plurality of robots to survey the community based on the one or more traversability scores. The controller is configured to deploy, for each community from among the plurality of communities, at least one of the plurality of robots based on the plurality of robots assigned to the community.

20 Claims, 6 Drawing Sheets

(51) Int. Cl.
  *G05B 19/4155* (2006.01)
  *G05D 1/00* (2006.01)
  *B64C 39/02* (2023.01)

(52) U.S. Cl.
  CPC ......... *G05D 1/0217* (2013.01); *G05D 1/0274* (2013.01); *G05D 1/0297* (2013.01); *B60W 2510/242* (2013.01); *B64C 39/024* (2013.01); *G05B 2219/45066* (2013.01)

(58) Field of Classification Search
  CPC .......... B60W 2510/242; G05D 1/0217; G05D 1/0274; G05D 1/0297; G05D 2201/0207; B64C 39/024
  See application file for complete search history.

(56) References Cited

U.S. PATENT DOCUMENTS

| | | |
|---|---|---|
| 2019/0369641 A1 | 12/2019 | Gillett |
| 2020/0012284 A1 | 1/2020 | Morita et al. |
| 2020/0041560 A1* | 2/2020 | Schwartz ............... G06N 3/045 |
| 2020/0047343 A1* | 2/2020 | Bal ...................... G05D 1/0219 |
| 2020/0103921 A1* | 4/2020 | Voorhies ............. G05D 1/0217 |
| 2021/0188430 A1* | 6/2021 | Kisiler ................. G08G 5/0043 |

OTHER PUBLICATIONS

Chen, Deploying Robots and Drones in Process Plants and Facilities, Control Engineering, pp. 1-10, Feb. 5, 2020.

\* cited by examiner

FIG. 6

SYSTEMS AND METHODS FOR SURVEYING A MANUFACTURING ENVIRONMENT

CROSS-REFERENCE TO RELATED APPLICATIONS

This application claims priority to and the benefit of U.S. Provisional Application 63/057,136 filed on Jul. 27, 2020. The content of the above application is incorporated herein by reference in their entirety.

FIELD

The present disclosure relates to systems and methods for surveying a manufacturing environment.

BACKGROUND

The statements in this section merely provide background information related to the present disclosure and may not constitute prior art.

A "digital twin" may refer to a digital map of components in an environment that is based on physical data, virtual data, and interaction data between the physical data and the virtual data. One feature of the digital twin is the ability to capture existing conditions to provide the obtained information in a digital format and to generate a virtual world. As an example, artificial reality (AR) and virtual reality (VR) are utilized during the implementation of the digital twin concept.

To generate the virtual world, sensing systems including cameras or light detection and ranging (LIDAR) sensors capture scene information at frequent intervals or at a given time. To capture scene information, a data supplier may need to physically travel to a particular facility and manually place a tripod with a laser scanner that utilizes LIDAR and a 360-degree camera. The supplier walks the floor of said facility and places the scanner at locations that have been conveyed in the project to collect appropriate data. Once captured, the supplier processes the data to stitch together individual areas to construct a larger model.

However, data collected by the supplier may be outdated as the facility undergo renovation and changes, and the accuracy of the content may be compromised. In addition, the cost for collecting and updating the data and the delivery time of the data may be significant. Delays in data collection and updates due to the time and cost constraints may result in inhibited accuracy of the data.

To automate data capturing and address these issues, wheeled robots may be utilized to move around the facility and collect data. However, there are inherent and persistent obstacles in plants or factories that traditional wheeled robots may not traverse. For example, stairs, narrow corridors, ground obstacles that could damage a robot, etc. may present obstacles to wheeled robots. Moreover, it may take a long time for wheeled robots to physically scan a target area.

SUMMARY

This section provides a general summary of the disclosure and is not a comprehensive disclosure of its full scope or all of its features.

The present disclosure provides a survey system for surveying an environment. The survey system includes a controller storing a map comprising a plurality of nodes representing data capture points of the environment. The controller is configured to segment the plurality of nodes into a plurality of communities, where each community from among the plurality of communities includes a set of nodes from among the plurality of nodes. The controller is configured to generate, for each community from among the plurality of communities, one or more traversability scores indicating a traversability of a given region of the environment corresponding to the community. The controller is configured to assign, for each community from among the plurality of communities, at least one robot from among a plurality of robots to survey the community based on the one or more traversability scores. The controller is configured to deploy, for each community from among the plurality of communities, at least one of the plurality of robots based on the plurality of robots assigned to the community.

In one form, the plurality of robots comprises a central robot comprising a central mobility characteristic, a first auxiliary robot comprising a first auxiliary mobility characteristic, and a second auxiliary robot comprising a second auxiliary mobility characteristic. In one form, the central robot is a wheeled carrier platform robot, the first auxiliary robot is a legged robot, and the second auxiliary robot is an unmanned aerial vehicle robot. In one form, the controller is configured to segment the plurality of nodes into the plurality of communities based on Euclidean distances between the plurality of nodes, traversability scores between the plurality of nodes, obstructions of the environment, a communication range of the plurality of robots, or a combination thereof. In one form, the controller is configured to assign, for each community from among the plurality of communities, at least one of the plurality of robots based on a battery life of the plurality of robots. In one form, the controller is configured to assign, for each community from among the plurality of communities, at least one of the plurality of robots based on a knapsack optimization routine. In one form, the controller is further configured to generate, for the plurality of robots, a community route among the plurality of communities, an intracommunity route within each community from among the plurality of communities, or a combination thereof. In one form, the controller is configured to generate the community route and the intracommunity route based on a traveling salesman problem routine. In one form, the controller is configured to generate a plurality of traversability scores, as the one or more traversability scores, for each robot from among the plurality of robots.

The present disclosure provides a survey system for surveying an environment. The survey system includes a plurality of robots configured to travel within environment, where the plurality of robots comprises a central robot comprising a first mobility characteristic and an auxiliary robot comprising a second mobility characteristic. The survey system includes a controller storing a map comprising a plurality of nodes representing data capture points of the environment. The controller is configured to segment the plurality of nodes into a plurality of communities, where each community from among the plurality of communities includes a set of nodes from among the plurality of nodes. The controller is configured to generate, for each community from among the plurality of communities, one or more traversability scores indicating a traversability of a given region of the environment corresponding to the community. The controller is configured to assign, for each community from among the plurality of communities, at least one robot from among a plurality of robots to survey the community based on the one or more traversability scores and a battery life of the plurality of robots. The controller is configured to deploy, for each community from among the plurality of communities, at least one of the plurality of robots based on the plurality of robots assigned to the community.

In one form, the central robot is a wheeled carrier platform robot, and the auxiliary robot is one of a legged robot and an unmanned aerial vehicle robot. In one form, the auxiliary robot is attached to the first robot, and the central robot further comprises a charging device configured to charge the auxiliary robot when the auxiliary robot is attached to the first robot. In one form, the survey system includes one or more sensors disposed on at least one of the plurality of robots, and the controller is configured to obtain data representing the environment from the one or more sensors and update the map based on the data. In some forms, the controller is configured to instruct the auxiliary robot to detach from the central robot in response to the plurality of robots being at a location of the environment associated with a community that is assigned to the auxiliary robot.

The present disclosure provides a method including segmenting a plurality of nodes representing data capture points of the environment into a plurality of communities, where each community from among the plurality of communities includes a set of nodes from among the plurality of nodes. The method includes generating, for each community from among the plurality of communities, one or more traversability scores indicating a traversability of a given region of the environment corresponding to the community. The method includes assigning, for each community from among the plurality of communities, at least one robot from among a plurality of robots based on the one or more traversability scores. The method includes generating, for the plurality of robots, an intracommunity route within each community from among the plurality of communities. The method includes deploying, for each community from among the plurality of communities, at least one of the plurality of robots based on the plurality of robots assigned to the community and the intracommunity route of the community.

In one form, the method includes generating, for the plurality of robots, a community route among the plurality of communities, where the community route and the intracommunity route are generated based on a traveling salesman problem routine. In one form, the plurality of nodes is segmented into the plurality of communities based on Euclidean distances between the plurality of nodes, traversability scores between the plurality of nodes, obstructions of the environment, a communication range of the plurality of robots, or a combination thereof. In one form, the method includes assigning, for each community from among the plurality of communities, the at least one robot from among the plurality of robots based on a battery life of the plurality of robots. In one form, where, for each community from among the plurality of communities, the at least one of the plurality of robots is assigned based on a knapsack optimization routine. In one form, the plurality of robots includes a central robot comprising a central mobility characteristic, a first auxiliary robot comprising a first auxiliary mobility characteristic, and a second auxiliary robot comprising a second auxiliary mobility characteristic.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides a view of a plant or factory that is analogous to a street view presented by a mapping software, such as GOGGLE® Maps. In one form, the plant or factory represents an environment in which one or more robots survey and capture manufacturing data. While the forms described herein relate to a plant or factory environment and settings, it should be understood that the present disclosure is not limited to these forms described herein. For example, variations of the environment described in the present disclosure include places/locations/volumes that involve a survey and data capturing, such as offices, confined indoor spaces, confined outdoor spaces (e.g., construction sites), and for various purposes, such as construction, renovation, planning for equipment arrangements, public health reasons (e.g., sterilization planning), furniture arrangement, etc.

The present disclosure provides a survey system that includes robots of different mobility characteristics and a method for operating the survey system. In one form, the survey system augments a wheeled robot-based system instead of replacing the wheeled robot-based system based on power related considerations. In one form, the wheeled robot-based system provides a battery system that enables long term operations of the robots. The survey system and method according to one or more forms of the present disclosure may increase the coverage of the survey system and reduce the time to explore and survey the environments. As a result, the survey system and method of the present disclosure provide data capturing/collection in an enhanced time and cost-effective manner.

The survey system and method according to one or more forms of the present disclosure may reduce a frequency that robots mount on and/or dismount from a main robot system.

In some forms, the main robot system includes a wheeled robot system. The survey system and method consider traversability scores at nodes designated by communications within an area to be surveyed. Based on the consideration of the traversability scores, the survey system and method determine which agent should be deployed. As used herein, "traversability scores" refers to a metric corresponding to an amount of time and/or ability for a given robot to travel from a first location to a second location within the environment.

The survey system and method according to one or more forms of the present disclosure may minimize communication loss. While a robot is deployed from a main robot system, the robot will remain communicatively coupled to the main robot system. This may prevent the situation where the robot is deployed and communication is lost.

Referring to the drawings, descriptions of the survey system and method according to one or more forms of the present disclosure are provided in detail below.

Figure 1:
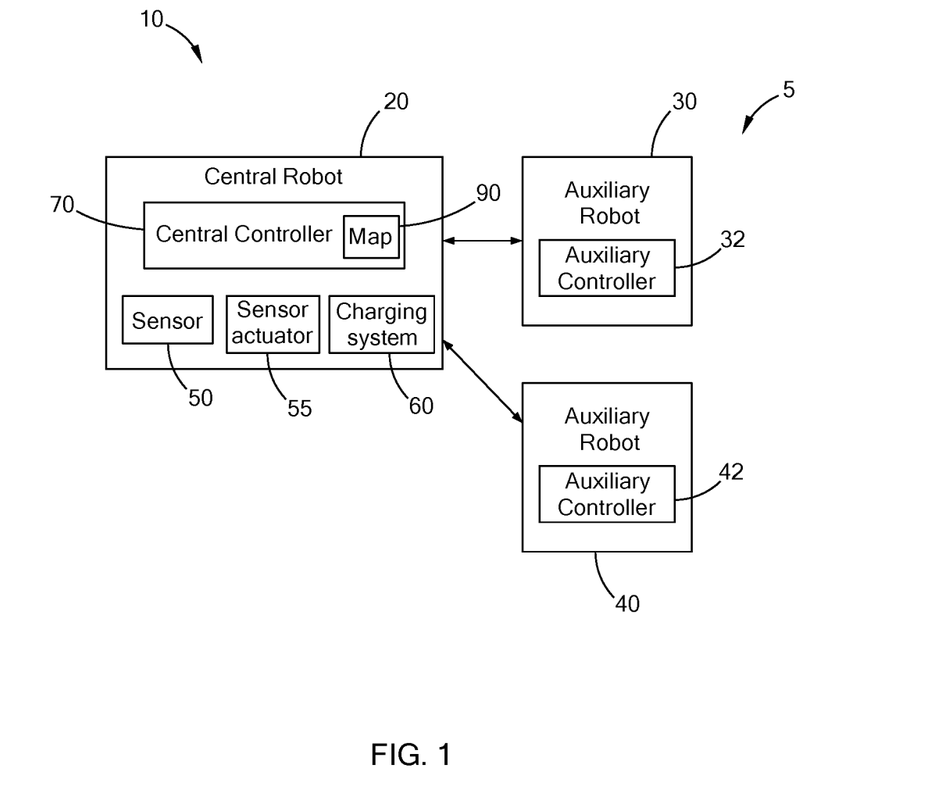
FIG. 1 is a block diagram showing a survey system having a plurality of robots according to one or more forms of the present disclosure.
Figure 2:
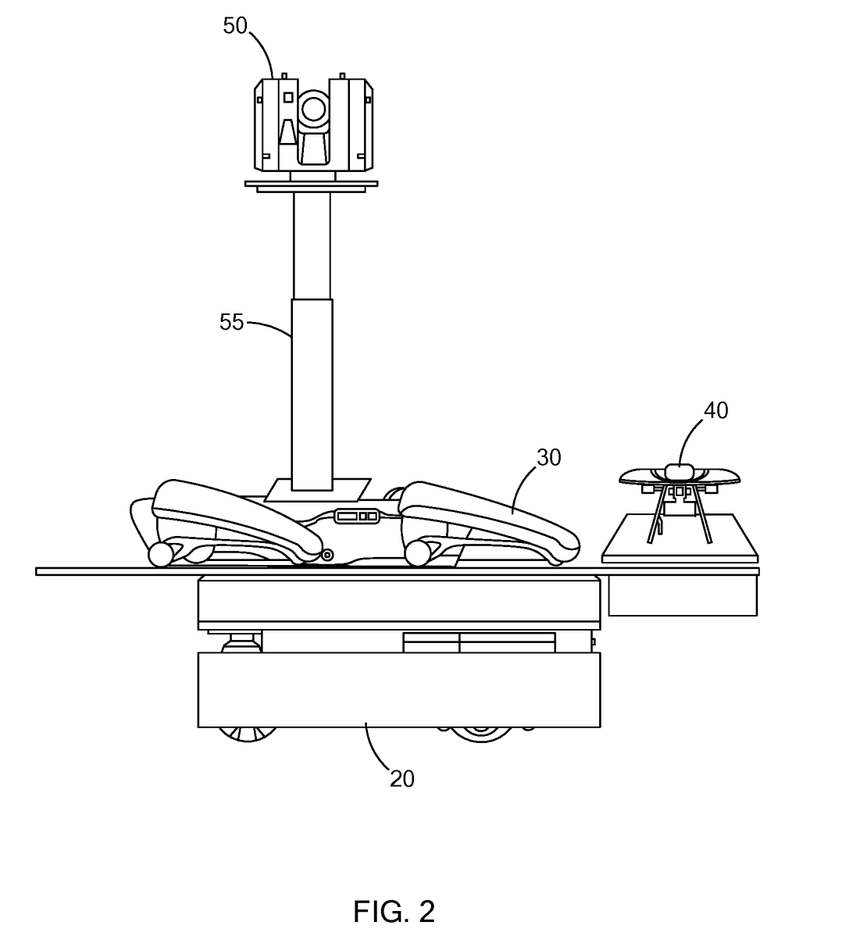
FIG. 2 is a schematic implementation of a survey system according to one or more forms of the present disclosure.

Referring to FIGS. 1-2, an environment 5 including a survey system 10 according to one or more forms of the present disclosure is provided. In one form, the survey system 10 includes a central robot 20, an auxiliary robot 30 having an auxiliary controller 32, and an auxiliary robot 40 having an auxiliary controller 42. In one form, the central robot 20 includes a sensor 50, a sensor actuator 55, a charging system 60, and a central controller 70. While the central controller 70 is illustrated as part of the central robot 20, the auxiliary controller 32 is illustrated as part of the auxiliary robot 30, and the auxiliary controller 42 is illustrated as part of the auxiliary robot 40, it should be understood that the central controller 70 and/or the auxiliary controller 32, 42 may be positioned at any location within the environment 5.

In one form, the central robot 20 and the auxiliary robots 30, 40 have different mobility characteristics. As an example, the central robot 20 is a wheeled carrier platform robot, the auxiliary robot 30 is a legged robot, and the auxiliary robot 40 is an unmanned aerial vehicle robot (e.g., a drone) configured to access places in the environment 5 that the central robot 20 and the auxiliary robot 40 may not access. It should be understood that the central robot 20 and the auxiliary robots 30, 40 may have different mobility characteristics and are not limited to the mobility characteristics described herein.

In some forms, the central robot 20 is configured to physically support and/or accommodate the auxiliary robots 30, 40. As an example, the auxiliary robots 30, 40 may be attached or mounted to the central robot 20 when the central robot 20 is traversing the environment 5.

In one form, the central robot 20 and the auxiliary robots 30, 40 are partially or fully autonomous and configured to autonomously move to various locations of the environment 5 based on data from one or more autonomous navigation sensors disposed thereon (e.g., a global navigation satellite system (GNSS) sensor, an imaging sensor, a local position sensor, among others). Specifically, the auxiliary controllers 32, 42 and the central controller 70 are configured to process the data from the autonomous navigation sensors and perform known autonomous navigation routines to navigate the environment 5.

In one form, the central controller 70 is configured to control the deployment and operation of the auxiliary robots 30, 40. As an example, the central controller 70 is configured to broadcast a command to the auxiliary controllers 32, 42 to deploy and/or detach from the central robot 20 and autonomously navigate the environment 5 to initiate the surveying routines described herein in further detail. To perform the functionality described herein, the auxiliary controllers 32, 42 and the central controller 70 may each include one or more processor circuits that are configured to execute machine-readable instructions stored in the one or more nontransitory computer-readable mediums, such as a random-access memory (RAM) circuit and/or read-only memory (ROM) circuit. Furthermore, the auxiliary controllers 32, 42 and the central controller 70 may each include movement drivers and systems, transceivers, routers, and/or input/output interface hardware to perform the functionality described herein.

In one form, the sensor actuator 55 is a telescoping mechanism having a retractable leg, a linear electric actuator, among other actuators configured to adjust the position of the sensor 50. In one form, the sensor 50 is an image sensor, a two-dimensional (2D) camera, a three-dimensional (3D) camera, an infrared sensor, a radar scanner, a laser scanner, among other imaging devices. In one form, additional sensors 50 may be disposed in the environment 5 and communicably coupled with the central controller 70. In one form, the central controller 70 is configured to control the operations of the sensor actuator 55 and the sensor 50. In one form, each of the robots 20, 30, 40 includes a respective sensor 50, but it should be understood that one sensor 50 may be shared by the robots 20, 30, 40 to perform the scanning routines described below in further detail.

In one form, the charging system 60 is disposed on the central robot 20 and includes electrical components that are configured to charge the auxiliary robots 30, 40 while the auxiliary robots 30, 40 are supported by and/or attached/mounted to the central robot 20. In one form, the central robot 20 may have a battery life that is greater than a battery life of the auxiliary robots 30, 40. As described herein in further detail, the central controller 70 may selectively deploy the auxiliary robots 30, 40 based on the battery life and the mobility characteristics of the auxiliary robots 30, 40. To perform the functionality described herein, the charging system 60 may include a controller configured to transmit data associated with a battery life of the robots 20, 30, 40 to the central controller 70.

In one form, the central controller 70 includes a map 90 corresponding to the environment 5. In one form, the map 90 stores communities and nodes associated with one or more areas of the environment 5, where the nodes correspond to data points captured by the survey system 10. The areas that are surveyed by the survey system 10 may be represented as a graph and segmented into a plurality of communities, where each community is associated with one or more nodes. In some forms, the central controller 70 is configured to load the map 90 when the survey system 10 is dispatched in the environment 5. Additionally, or alternatively, the map 90 may include nodes and communities that may be adjusted and updated as the survey system 10 surveys the environment 5. In some forms, a basic map of the environment 5 is provided to an operator of the survey system 10, and the central controller 70 is configured to customize and adapt basic map in terms of traversability scores of the central robot 20 and the auxiliary robots 30, 40. Additional details regarding the map 90 are described below in further detail.

Figure 3:
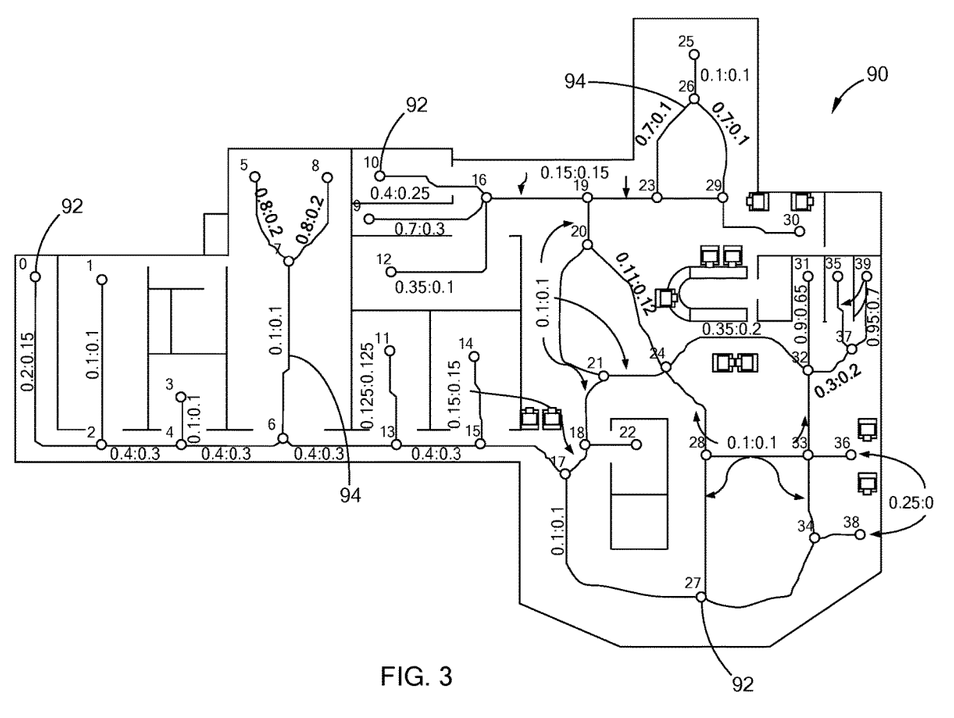
FIG. 3 illustrates one example of a map of a survey area where the survey system is deployed according to one or more forms of the present disclosure.

Referring to FIG. 3, an example illustration of the map 90 is shown. In one form, the map 90 is a graph including a plurality of nodes 92 representing various locations within the environment 5 and a plurality of edges 94 connecting the nodes 92. In one form, the map 90 includes traversability scores disposed proximate to the edges 94. In one form, the traversability score is a numeric range (e.g., 0 to 1), a categorical description/textual string, among other metrics representing a traversability of a given robot (e.g., the central robot 20) between a given set of nodes 92. As an example and as shown in FIG. 3, a higher traversability score corresponds to increased traversability between a set of nodes 92, and a lower score corresponds to inhibited traversability between a set of nodes 92. Furthermore and as shown in FIG. 3, a pair of traversability scores are provided proximate to each edge 94, and each traversability score corresponds to one of the robots of the survey system 10 (e.g., the central robot 20 and the auxiliary robot 30). As described below in further detail, the central controller 70 is configured to select one of the robots 20, 30, 40 to survey a given area of the environment 5 based on one or more traversability scores of a corresponding node 92 and/or paths representing the corresponding edges 94.

Figure 4:
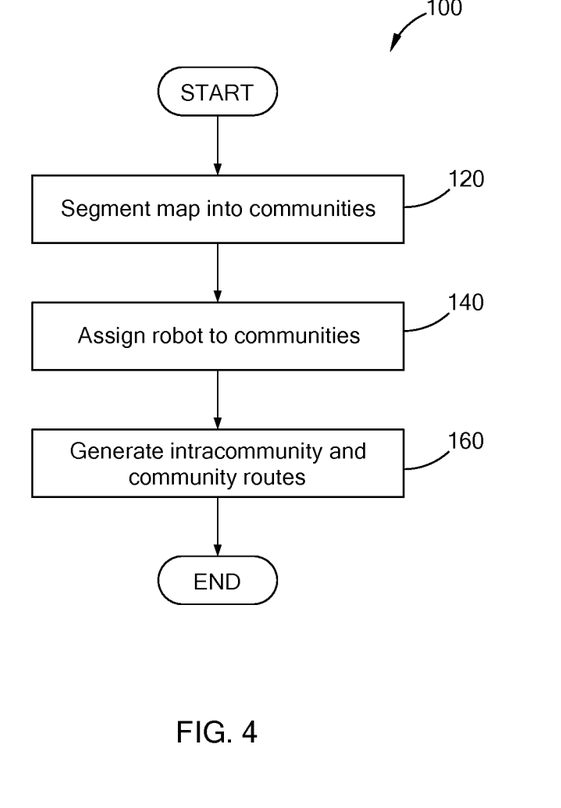
FIG. 4 is a flowchart illustrating an example planning routine for surveying a selected area of an environment according to one or more forms of the present disclosure.

Referring to FIG. 4, a flowchart illustrating an example planning routine 100 for surveying a selected area of the environment 5 is shown. At 120, the central controller 70 segments the map 90 (e.g., a graph) into a plurality of communities. In one form, the central controller 70 defines a set of nodes 92 within the map 90 as the community.

In one form, the central controller 70 may define the community such that each node from among the connections between the corresponding set of nodes 92 (e.g., the edges 94) are denser than connections with each other set of nodes 92. In one form, the central controller 70 may define the set of nodes 92 based on Euclidean distances between the nodes 92, traversability scores of the edges 94 between the nodes 92, bottle neck areas of the environment 5, a communication range of the robots 20, 30, 40, or a combination thereof.

As an example, the central controller 70 may define a community as a set of nodes 92 such that a Euclidean distance between each respective node 92 is less than a communication range of the robots 20, 30, 40, thereby enabling the robots 20, 30, 40 to remain communicably coupled (e.g., tethered) to each other while obtaining data of the environment 5. As another example, the central controller 70 may define the communities based on traversability scores of the edges 94 between the nodes 92. Specifically, the central controller 70 may employ known label propagation routines based on the nodes 92 and the traversability scores of the edges 94 between various nodes 92 to define the communities. As an additional example, the central controller 70 may define a community as a set of nodes 92 associated with a bottle neck area of the environment 5, which may include structures that inhibit the traversability of the central robot 20 (e.g., areas of the environment 5 that are accessible via stairs and/or not accessible by the central robot 20).

Figure 5:
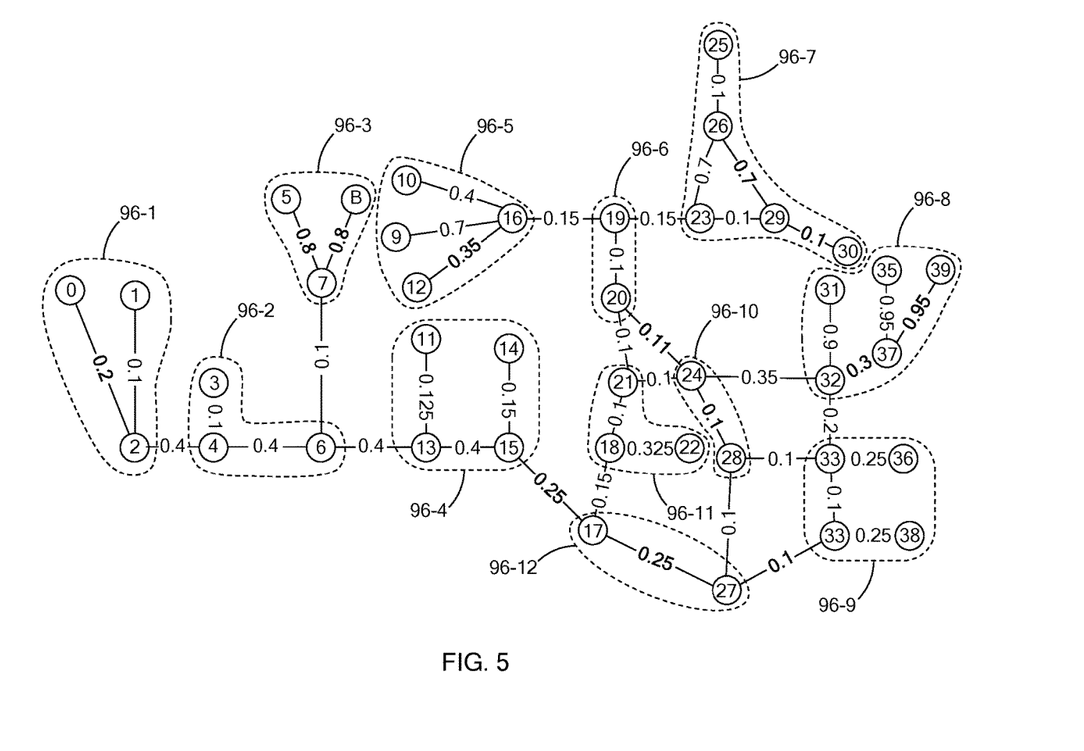
FIG. 5 illustrates a plurality of communities of a map according to one or more forms of the present disclosure.

As a specific example and referring to FIG. 5, the central controller 70 may define twelve communities 96-1, 96-2, . . . 96-12 (collectively referred to as "communities 96" herein) within the environment 5 that each include a respective set of the nodes 92. In one form, the set of nodes 92 within each community 96 are separated by a Euclidean distance that is less than a communication range of the robots 20, 30, 40, thereby enabling the robots 20, 30, 40, and the central controller 70 defines the communities 96 based on the label propagation routine. In some forms, the communities 96 may each include distinct visual characteristics (e.g., unique colors, unique shapes, unique text, among others).

Referring to FIG. 4, at 140, the central controller 70 assigns the robots 20, 30, 40 to the communities 96. In one form, the central controller 70 assigns one or more of the robots 20, 30, 40 to survey each node 92 (or a subset of nodes 92) of a given community 96. In one form, the central controller 70 assigns the robots 20, 30, 40 to the communities 96 based on a battery life of the robots 20, 30, 40, a traversability score of the edges 94 connecting the nodes 92 within the given community 96, or a combination thereof. As an example, the central controller 70 assigns the central robot 20 to community 96-1 if the traversability scores indicate that the central robot 20 can readily traverse the region of the environment 5 corresponding to the community 96-1 (e.g., the region is flat and does not include stairs or other obstacles/infrastructure inhibiting the traversability). As another example, the central controller 70 assigns the auxiliary robot 40 (e.g., a drone) to community 96-2 when the battery life of the auxiliary robot 40 is sufficient to perform the scanning routine and when the community 96-3 has a traversability score indicating that the central robot 20 cannot readily traverse the region of the environment 5 corresponding to the community 96-2 (e.g., the region includes stairs). As an additional example, the central controller 70 assigns the central robot 20 and the auxiliary robot 30 to community 96-3 if the traversability scores indicate that the central robot 20 can readily traverse the region of the environment 5 corresponding to the community 96-3 and that the auxiliary robot 30 has sufficient battery life to scan at least a portion of the set of nodes 92 of the community 96-3.

In one form, the central controller 70 assigns the robots 20, 30, 40 to the communities 96 based on a knapsack optimization routine. As an example, the central controller 70 performs the knapsack optimization routine to determine a value "V" of deploying, for example, the auxiliary robot 30 to survey each node 92 along each edge 94 of a given community 96, as shown below in equations (1)-(3).

$$X = \left(\sum_{i=0}^{path} \frac{1}{1-(\tau_s)_i}\right) \quad (1)$$

$$W = \left(\sum_{i=0}^{path} \frac{1}{1-(\tau_r)_i}\right) \quad (2)$$

$$V = (X-W) * \frac{ns}{A} \quad (3)$$

In equations (1)-(3), "X" is an encoded value indicating a time savings for the auxiliary robot 30 to survey each node 92 along each edge 94 of a given community 96, "W" is an encoded value indicating a battery consumption for the auxiliary robot 30 to survey each node 92 along each edge 94 of a given community 96, and "V" refers to an encoded value that represents a combination of a time savings and a battery/energy consumption for the auxiliary robot 30 to survey each node 92 along each edge 94 of a given community 96. In equation (3), "n" is a number of nodes 92 in a given community, "s" is a field of view of the sensor 50, and "A" is the area of the community 96. It should be understood that respective values "X," "W", and "V" may be determined for each of the auxiliary robots 30, 40.

Referring to FIG. 5, in one form, the central controller 70 may assign the auxiliary robot 30 to community 96-1, which may be associated with higher traversability scores and physical obstructions inhibiting traversability (e.g., stairs) based on the traversability score, the knapsack optimization routine, or a combination thereof. Furthermore, the central controller 70 may assign the central robot 20 to community 96-2 based on the traversability score, the knapsack optimization routine, or a combination thereof. Accordingly, when the central robot 20 approaches a region of the environment 5 corresponding to community 96-1, the auxiliary robot 30 may detach from the central robot 20 and survey the community 96-1. It should be understood that the auxiliary robot 30 may remain attached/mounted to the central robot 20 while performing the surveying routine in other variations. In response to completing the survey routine at a region of the environment 5 corresponding to community 96-1, the auxiliary robot 30 may attach itself to the central robot 20, and the central robot 20 proceeds to community 96-2. When the central robot 20 arrives at the community 96-2, the central robot 20 surveys the community 96-2. It should be understood that the example routine may be performed for each community 96 of the environment 5.

Referring to FIG. 4, at 160, the central controller 70 generates routes for the robots 20, 30, 40. In one form, the central controller 70 is configured to generate routes for the robots 20, 30, 40 between the communities 96 (referred to herein as a "community route") and/or within the set of nodes of each community 96 (referred to herein as an "intracommunity route"). In one form, the central controller 70 defines the community and intracommunity routes of the robots 20, 30, 40 such to inhibit an overall distance traveled by the robots 20, 30, 40 while performing the surveying routine. As an example, the central controller 70 is configured to perform known route planning routines, such as a traveling salesman problem (TSP) routine, to generate the community and intracommunity routes for the robots 20, 30, 40.

In one form, when the central controller 70 performs the planning routine 100, the robots 20, 30, 40 may survey each node 92 of the map 90, but it should be understood that the robots 20, 30, 40 may not survey each node 92 in other variations. In one form, the central controller 70 may be configured to select the nodes 92 to be surveyed by weighing predicted information quality and predicted energy consumption to visit given each node 92. As an example, the central controller 70 may select and determine nodes 92 to be surveyed by performing a knapsack optimization routine or other similar routines.

Figure 6:
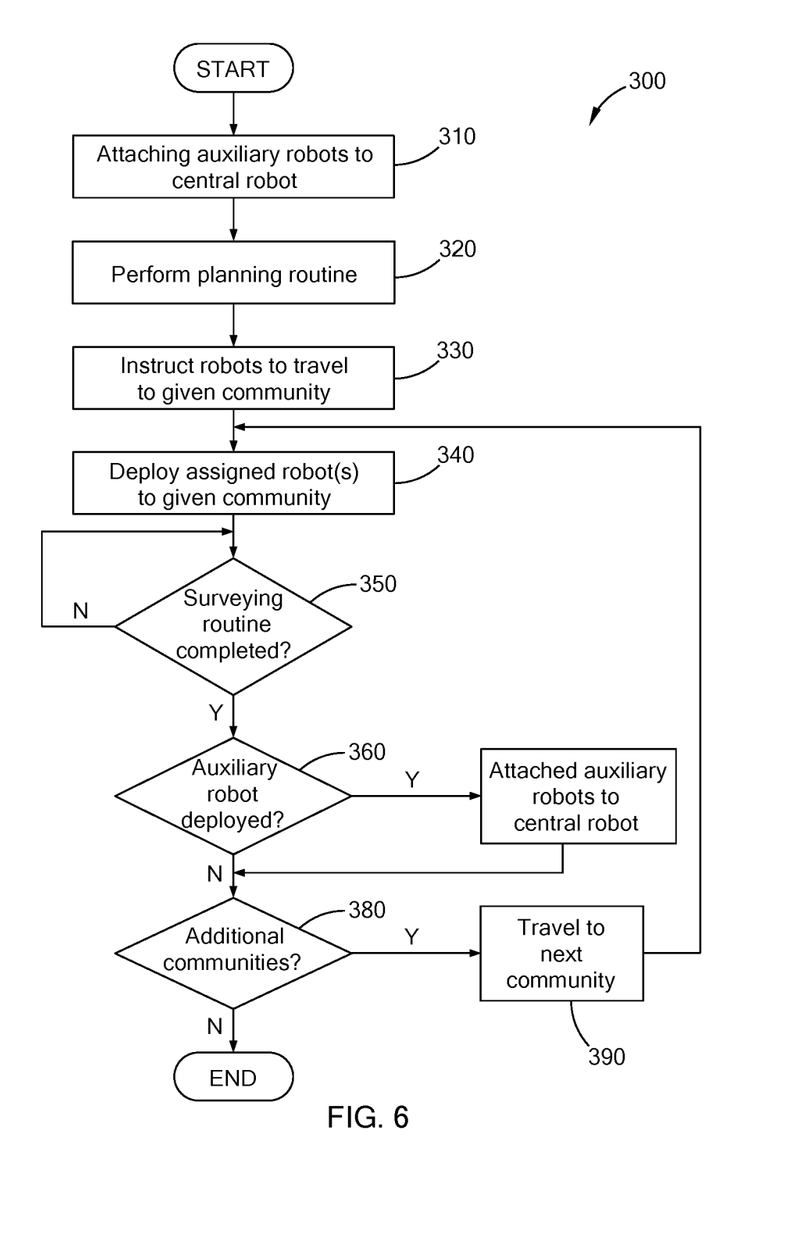
FIG. 6 is a flowchart illustrating an example surveying routine for an environment according to one or more forms of the present disclosure.

Referring to FIG. 6, a flowchart illustrating an example surveying routine 300 for surveying a selected area of the environment 5 is shown. At 310, at least one of the auxiliary robots 30, 40 is positioned on/attached to the central robot 20. For example, an operator and/or another robot physically positions the auxiliary robot 30, 40 onto the central robot 20. In yet another example, the auxiliary robot 30, 40 is electrically controlled or commanded to place itself onto the central robot 20.

At 320, the central controller 70 performs a planning routine to segment the map 90 into the communities 96, assign the robots 20, 30, 40 to the communities 96, and generate the routes for the robots 20, 30, 40 among and within the communities 96. As an example, at 320, the central controller 70 performs the planning routine 100 described above with reference to FIG. 4.

At 330, the central controller 70 instructs the robots 20, 30, 40 to travel to given community 96 based on the route generated by the planning routine. At 340, the central controller 70 deploys the assigned robot(s) (e.g., the central robot 20) to scan the area of the environment 5 associated with the given community 96 and based on the identified route within the community 96. At 350, the central controller 70 determines whether the surveying routine for the given community 96 is complete. If so, the central controller 70 proceeds to 360. Otherwise, the routine 300 remains at 350 until the surveying routine is completed.

At 360, the central controller 70 determines whether one of the auxiliary robots 30, 40 was deployed at the given community 96. If so, the routine 300 proceeds to 370, where the central controller 70 instructs the auxiliary robots 30, 40 to attach itself to the central robot 20 and instructs the charging system 60 to charge the auxiliary robots 30 and then proceeds to 380. If the central controller 70 determines the auxiliary robots 30, 40 were not deployed at the given community 96, the routine 300 proceeds to 380, where the central controller 70 determines whether the environment 5 includes additional communities 96 to be surveyed. If so, the routine 300 proceeds to 390, where the central controller 70 instructs the robots 20, 30, 40 to travel to the next community 96 based on, for example, the route identified by the planning routine 100 at step 320. Otherwise, if each community 96 has been surveyed by the robots 20, 30, 40, the routine 300 ends.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A survey system for surveying an environment, the survey system comprising:
   a controller storing a map comprising a plurality of nodes representing data capture points of the environment, the controller configured to:
      segment the plurality of nodes into a plurality of communities, wherein each community from among the plurality of communities includes a set of nodes from among the plurality of nodes;
      generate, for each community from among the plurality of communities, one or more traversability scores indicating a traversability of a given region of the environment corresponding to the community, wherein the traversability score comprises a numeric range, a categorical description, or a combination thereof;
      assign, for each community from among the plurality of communities, at least one robot from among a plurality of robots to survey the community based on the one or more traversability scores; and
      deploy, for each community from among the plurality of communities, at least one of the plurality of robots based on the plurality of robots assigned to the community.

2. The survey system of claim 1 further comprises the plurality of robots, wherein the plurality of robots includes:
   a central robot comprising a central mobility characteristic;
   a first auxiliary robot comprising a first auxiliary mobility characteristic; and
   a second auxiliary robot comprising a second auxiliary mobility characteristic.

3. The survey system of claim 2, wherein:
   the central robot is a wheeled carrier platform robot;
   the first auxiliary robot is a legged robot; and
   the second auxiliary robot is an unmanned aerial vehicle robot.

4. The survey system of claim 1, wherein the controller is configured to segment the plurality of nodes into the plurality of communities based on Euclidean distances between the plurality of nodes, traversability scores between the plurality of nodes, obstructions of the environment, a communication range of the plurality of robots, or a combination thereof.

5. The survey system of claim 1, wherein the controller is configured to assign, for each community from among the plurality of communities, at least one of the plurality of robots based on a battery life of the plurality of robots.

6. The survey system of claim 1, wherein the controller is configured to assign, for each community from among the plurality of communities, at least one of the plurality of robots based on a knapsack optimization routine.

7. The survey system of claim 1, wherein the controller is further configured to generate, for the plurality of robots, a community route among the plurality of communities, an intracommunity route within each community from among the plurality of communities, or a combination thereof.

8. The survey system of claim 7, wherein the controller is configured to generate the community route and the intracommunity route based on a traveling salesman problem routine.

9. The survey system of claim 1, wherein the controller is configured to generate a plurality of traversability scores, as the one or more traversability scores, for each robot from among the plurality of robots.

10. A survey system for surveying an environment, the survey system comprising:
    a plurality of robots configured to travel within environment, wherein the plurality of robots comprises a central robot comprising a first mobility characteristic and an auxiliary robot comprising a second mobility characteristic;
    a controller storing a map comprising a plurality of nodes representing data capture points of the environment, the controller configured to:
       segment the plurality of nodes into a plurality of communities, wherein each community from among the plurality of communities includes a set of nodes from among the plurality of nodes;
       generate, for each community from among the plurality of communities, one or more traversability scores indicating a traversability of a given region of the environment corresponding to the community, wherein the traversability score comprises a numeric range, a categorical description, or a combination thereof;
       assign, for each community from among the plurality of communities, at least one robot from among the plurality of robots to survey the community based on the one or more traversability scores and a battery life of the plurality of robots; and
       deploy, for each community from among the plurality of communities, at least one of the plurality of robots based on the plurality of robots assigned to the community.

11. The survey system of claim 10, wherein:
    the central robot is a wheeled carrier platform robot; and
    the auxiliary robot is one of a legged robot and an unmanned aerial vehicle robot.

12. The survey system of claim 10, wherein the auxiliary robot is attached to the first robot, and the central robot further comprises a charging device configured to charge the auxiliary robot when the auxiliary robot is attached to the first robot.

13. The survey system of claim 10 further comprising one or more sensors disposed on at least one of the plurality of robots, wherein the controller is configured to:
    obtain data representing the environment from the one or more sensors; and
    update the map based on the data.

14. The survey system of claim 10, wherein the controller is configured to instruct the auxiliary robot to detach from the central robot in response to the plurality of robots being at a location of the environment associated with a community that is assigned to the auxiliary robot.

15. A method for surveying an environment, the method comprising:
    segmenting a plurality of nodes representing data capture points of the environment into a plurality of communities, wherein each community from among the plurality of communities includes a set of nodes from among the plurality of nodes;
    generating, for each community from among the plurality of communities, one or more traversability scores indicating a traversability of a given region of the environment corresponding to the community, wherein the traversability score comprises a numeric range, a categorical description, or a combination thereof;
    assigning, for each community from among the plurality of communities, at least one robot from among a plurality of robots to survey the community based on the one or more traversability scores;

generating, for the plurality of robots, an intracommunity route within each community from among the plurality of communities; and deploying, for each community from among the plurality of communities, at least one of the plurality of robots based on the plurality of robots assigned to the community and the intracommunity route of the community.

16. The method of claim 15 further comprising generating, for the plurality of robots, a community route among the plurality of communities, wherein the community route and the intracommunity route are generated based on a traveling salesman problem routine.

17. The method of claim 15, wherein the plurality of nodes is segmented into the plurality of communities based on Euclidean distances between the plurality of nodes, traversability scores between the plurality of nodes, obstructions of the environment, a communication range of the plurality of robots, or a combination thereof.

18. The method of claim 15 further comprising assigning, for each community from among the plurality of communities, the at least one robot from among the plurality of robots based on a battery life of the plurality of robots.

19. The survey system of claim 15, wherein, for each community from among the plurality of communities, the at least one of the plurality of robots is assigned based on a knapsack optimization routine.

20. The survey system of claim 15, wherein the plurality of robots comprises:

a central robot comprising a central mobility characteristic;

a first auxiliary robot comprising a first auxiliary mobility characteristic; and a second auxiliary robot comprising a second auxiliary mobility characteristic.

* * * * *